US005431240A

United States Patent [19]

Merritt

[11] Patent Number: 5,431,240

[45] Date of Patent: Jul. 11, 1995

[54] TRACKED VEHICLE

[75] Inventor: John T. Merritt, Waterford, Wis.

[73] Assignee: PATENTials Incorporated, Nashville, Tenn.

[21] Appl. No.: 207,376

[22] Filed: Mar. 7, 1994

Related U.S. Application Data

[63] Continuation of Ser. No. 894,107, Jun. 5, 1992, abandoned.

[51] Int. Cl.[6] ....................... B62D 55/00; B62D 55/24; B66C 23/78

[52] U.S. Cl. .................................. 180/9.42; 180/9.23; 180/9.1; 280/763.1; 212/304; 212/289

[58] Field of Search ....................... 180/9.1, 9.23, 9.42; 280/763.1; 212/189, 164, 238, 261; 182/36–39, 2, 12, 13

[56] References Cited

U.S. PATENT DOCUMENTS

| | | | |
|---|---|---|---|
| 3,056,465 | 10/1962 | Gerrans | 182/148 |
| 3,227,295 | 1/1966 | Hamilton . | |
| 3,365,214 | 1/1968 | Garnett | 280/763.1 |
| 3,713,544 | 1/1973 | Wallace et al. | 212/189 |
| 3,777,898 | 12/1973 | Gallay | 212/189 |
| 3,884,359 | 5/1975 | Suverknop | 212/164 |
| 3,891,264 | 6/1975 | Hunter, II et al. | 182/2 X |
| 3,985,036 | 10/1976 | Decker et al. | 212/189 X |
| 4,014,400 | 3/1977 | Cline et al. | 180/9.1 |
| 4,124,124 | 11/1978 | Rivet | 212/164 |
| 4,195,740 | 4/1980 | Beduhn et al. | 180/9.1 X |
| 4,273,214 | 6/1981 | Grove | 182/2 |
| 4,282,794 | 8/1981 | Miller et al. | 182/148 |
| 4,326,571 | 4/1982 | Crawford | 212/238 X |
| 4,359,137 | 11/1982 | Merz et al. | 182/2 |
| 4,640,377 | 2/1987 | Wossner | 180/9.1 |
| 4,823,852 | 4/1989 | Langford | 180/9.1 X |
| 4,969,789 | 11/1990 | Searle | 212/238 X |
| 4,979,588 | 12/1990 | Pike et al. | 182/2 X |
| 4,986,377 | 1/1991 | Moriarty | 180/9.1 X |
| 5,117,595 | 6/1992 | Brendel | 212/189 X |
| 5,268,591 | 12/1993 | Fujimoto | 182/2 |
| 5,310,217 | 5/1994 | Paskey et al. | 280/763.1 |

FOREIGN PATENT DOCUMENTS

| | | | |
|---|---|---|---|
| 0652535 | 2/1963 | Italy | 212/189 |
| 5178172 | 7/1993 | Japan | 280/763.1 |
| 1548665 | 7/1979 | United Kingdom | 180/9.1 |
| 2135273 | 8/1984 | United Kingdom | 212/189 |

*Primary Examiner*—Eric D. Culbreth
*Assistant Examiner*—F. Zeender
*Attorney, Agent, or Firm*—Rick R. Wascher

[57] ABSTRACT

The invention is a small, maneuverable, self-propelled tracked vehicle equipped with a boom having a tool attached to an extendable section of the boom. The vehicle is small and light enough to enter and be used in places, such as residential yards, in which traditional vehicles with buckets and digging tools, because of their size and weight, cannot be used. A three-stage gear pump powers the tracks and the boom on the bucket or digger. The vehicle has four outriggers to stabilize the vehicle during use, the outriggers arranged substantially perpendicular to each other and at angles of approximately forty-five degrees from the longitudinal axis of the vehicle.

20 Claims, 1 Drawing Sheet

TRACKED VEHICLE

This is a continuation of application(s) Ser. No. 07/894,107 filed on Jun. 5, 1992 now abandoned.

BACKGROUND OF THE INVENTION

1. Field of the Invention

The present invention relates generally to tracked vehicles and light industrial equipment.

2. Description of the Related Art

Self-propelled industrial vehicles with buckets or digging tools are well known, and typically include a wheeled platform for mobility, a motor, and a boom. Some of the vehicles comprising the art to which the invention relates include a tool such as a bucket, digger, or an auger as a replaceable attachment.

All of such vehicles comprising the art to which the invention relates are typically quite large and heavy, and thus have limited uses. For example, a large, heavy, vehicle of the aforementioned type is not particularly useful in closely confined areas or areas where the ground on which the vehicle rests is not particularly dense. In such instances such vehicles have been known to sink into the ground and severly damage the terrain or landscaping.

A typical example of a location deemed inaccessible to a large or heavy vehicle found in the art to which the invention relates is a residential back yard. Accordingly, the work which could ordinarily be performed by large and heavy vehicles must be performed in another way, e.g., by having persons climb trees to trim limbs, or climb utility poles to service the utility wiring attached thereto. Therefore, some of the more common problems associated with vehicles comprising the art to which the invention relates includes, but is not limited to: lack of mobility in confined spaces, diminished utility where ground surfaces are such that they will not support the weight of the vehicle, the damage to lawns and landscaped terrain as a result of maneuvering such vehicles, transportability of such vehicles from location to location, cost of such vehicles, the materials used in the construction of such vehicles which makes them electrically conductive and possibily unsafe when in use around electrical lines and the like, to name a few.

The following patents identified by number and inventor, all of which are incorporated by reference as if fully set forth herein, are directed to various devices comprising the art to which the invention relates:

| | Inventor |
|---|---|
| U.S. Pat. No. | |
| 3,056,465 | Gerrans |
| 3,227,295 | Hamilton et al. |
| 3,365,214 | Garnett |
| 3,777,898 | Gallay |
| 3,884,359 | Suverkrop |
| 3,713,544 | Wallace |
| 3,891,264 | Hunter, II et al. |
| 3,985,036 | Decker et al. |
| 4,014,400 | Cline et al. |
| 4,823,852 | Langford |
| 4,124,124 | Rivet |
| 4,195,740 | Beduhn et al. |
| 4,273,214 | Grove |
| 4,282,794 | Miller et al. |
| 4,326,571 | Crawford |
| 4,640,377 | Wossner |
| 4,969,789 | Searle |
| 4,986,377 | Moriarity |

-continued

| | Inventor |
|---|---|
| 5,117,595 | Brendel |
| UK Patent Application Number | |
| 2,135,273 A | Moussu |
| 2,178,724 A | Wadsworth |
| 2,224,482 A | Williams |
| UK Patent Number | |
| 1,548,665 | Bunting et al. |
| Italian Patent Number | |
| 652,535 | unknown |

SUMMARY OF THE INVENTION

The present invention is a small, maneuverable, self-propelled vehicle with a tracked platform and a boom equipped with a bucket, digging tool, auger, or other useful implement (hereinafter collectively referred to as a "tool"). The tracks of the vehicle are preferably rubber or an elastomeric material, rather than metal, to provide a measure of electrical insulation between the vehicle and the ground on which it sits.

The vehicle also has an outrigger system which preferably comprises four pivotal and extendable outriggers attached to the plateform to stabilize the vehicle. Adjacent outriggers are arranged substantially perpendicular to each other and spaced apart at approximately ninety degrees from one another, and forty-five degrees from a longitudinal axis of the vehicle.

The preferred configuration of the outriggers include a hydraulic cylinder, an outrigger leg and a foot attached to the leg. The outrigger leg and hydraulic cylinder are pivotally attached to the platform via a brace enabling the outriggers to be raised and lowered to place the feet into a ground engaging contact. The outriggers therefore increase the area of ground contact to stabilize the vehicle when the boom is extended or otherwise used.

The feet are preferably fitted with rubber shoes. In combination with the preferred rubber or elastomeric track, they too provide insulation from electrical ground contact. When not in use, the outriggers are retracted and rest in a generally upright vertical orientation with the platform.

The platform is preferably formed of a high strength, lightweight material such as steel or metal alloys, aluminum, or possibly even synthetic materials. The platform typically forms the base onto which is attached a plurality of conventional strength enhancing structures such as, for example, I-beams and riser stiffeners. The platform may also comprise a boom support which supports the boom in a horizontal position when, for example, it is not in use.

The preferred embodiment of the boom component is formed of high strength fiberglass or other non-conductive material. The boom has a first main section and a second extendable section. The first section is can be elevated from a substantially horizontal position to a working position.

The second section of the boom is fitted with a bucket or tool. The boom is preferably mounted to a pivoting support or turret. The turret has a verticl portion and an angled portion. The angled portion acts as a counter weight and thus is angled in the direction away from the working or tool end of the boom. The turret enables rotation of the boom through 360 degrees of rotation.

In use, the operator sits at the operator station and manipulates control levers which engage and disengage the motor. A drive means is used to engage the tracks to propel the vehicle. In addition, a hydraulic pump means actuates the hydraulic cylinders of the system depending upon the cylinders selected by the operator. Although the present invention may use any of a variety of tools, the embodiment described herein has a bucket in which workers may be elevated.

It will be understood that the embodiment described hereinbelow is only one of many embodiments of the invention. It is possible to make modifications without departing from the scope or spirit of the invention as claimed.

Accordingly, there are a variety of ways in which the invention may be summarized, only one of which is the following: a compact self-propelled vehicle having a longitudinal axis. The vehicle comprises a platform, a pair of spaced apart tracks preferably of rubber or an elastomeric non-conducting material operably attached to the platform.

The invention also includes a plurality of spaced apart outriggers operatively attached to the platform and movable from a substantially vertical rest position to an operable ground engaging position by a hydraulic cylinder component. Each outrigger also includes a leg component and a foot for ground engaging contact. The foot is planar and is generally larger in area thean the cross-section of the leg. Such a configuration enables the foot to spread the forces applied to the ground by the leg over a wider area. Each outrigger is positioned at an angle to longitudinal axis of the vehicle.

As described above, the vehicle also includes an extendable boom having a first section, at least one hydraulic boom cylinder, and a second section, wherein the second section is configured to articulate with respect to the first section. A turret means is attached to the platform to allow 360 degrees of rotation therewith for rotating the boom, and a motor is attached to the platform to provide power to the tracks and hydraulics cylinders via a pump means.

The boom may also include bucket means for carrying articles and persons. The tracks are formed from an elastomeric material, or other non-conductive material.

Yet another way of summarizing the invention includes the following: a compact light industrial vehicle for off-road use. The vehicle comprises a platform having track means for propelling the platform, an extendable boom attached to the platform to allow 360 degrees of rotation with respect to the track means, hydraulic outrigger means pivotally attached to the platform and operable between a substantially vertical rest position to an operable ground engaging position, for stabilizing the platform, hydraulic pump means, attached to the platform, for powering the hydraulic boom and hydraulic outrigger means; and, engine means, attached to the platform, for powering the pump means.

The outrigger means comprises a plurality of legs and a plurality of hydraulic cylinders, as well as brace means for pivotally attaching the legs and the hydraulic cylinders to the platform. The legs may include feet and shoes.

The boom may further comprise a first section and a second section operable between and extended and a contracted position and articulatable with respect to the first section, and hydraulic means for extending and contracting the second section. The boom may be attached to the platform by way of a rotatable turret, or the platform may rotate with respect to the tracks.

It is an object of the present invention to provide a lightweight, compact tracked vehicle maneuverable in confined spaced.

It is an advantage of the present invention to provide a tracked vehicle of the aforementioned type with a freely pivotal boom.

It is a feature of the present invention to provide a freely rotating turret to provide rotation of a boom through 360 degrees.

It is an object of the present invention to provide a tracked vehicle of the aforementioned type with electrical contact insulating means.

It is an advantage of the present invention to provide the tracked vehicle of the aforementioned type with electrical insulating means to minimize the possibility of electrical contact with operator of the vehicle.

It is an object of the present invention to provide a tracked vehicle of the aforementioned type with a boom made of a non-conductive material such as fiberglass.

It is an advantage of the present invention to use the tracked vehicle of the aforementioned type around utility poles and lines.

It is a feature of the present invention to provide a non-electrically conductive fiberglass boom for preventing electrical energy from traveling down the boom and possibly to the operator of the vehicle.

It is an object of the present invention to provide a tracked vehicle of the aforementioned type with ground engaging outriggers.

It is an advantage of the present invention to provide an electrical energy inducting means to the outriggers to minimize the possibility of electrical energy from traveling up the outriggers from the ground and possibly reaching the operator of the vehicle.

These and other objects, advantages and features of the invention shall become apparent after consideration of the specification, including the drawings, and the appended claims. Accordingly, the objects, advantages and features set forth herein are merely representative of the those associated with the invention and are not intended to be limiting or an exhaustive list thereof.

DETAILED DESCRIPTION OF THE PREFERRED EMBODIMENT

Figure 1:
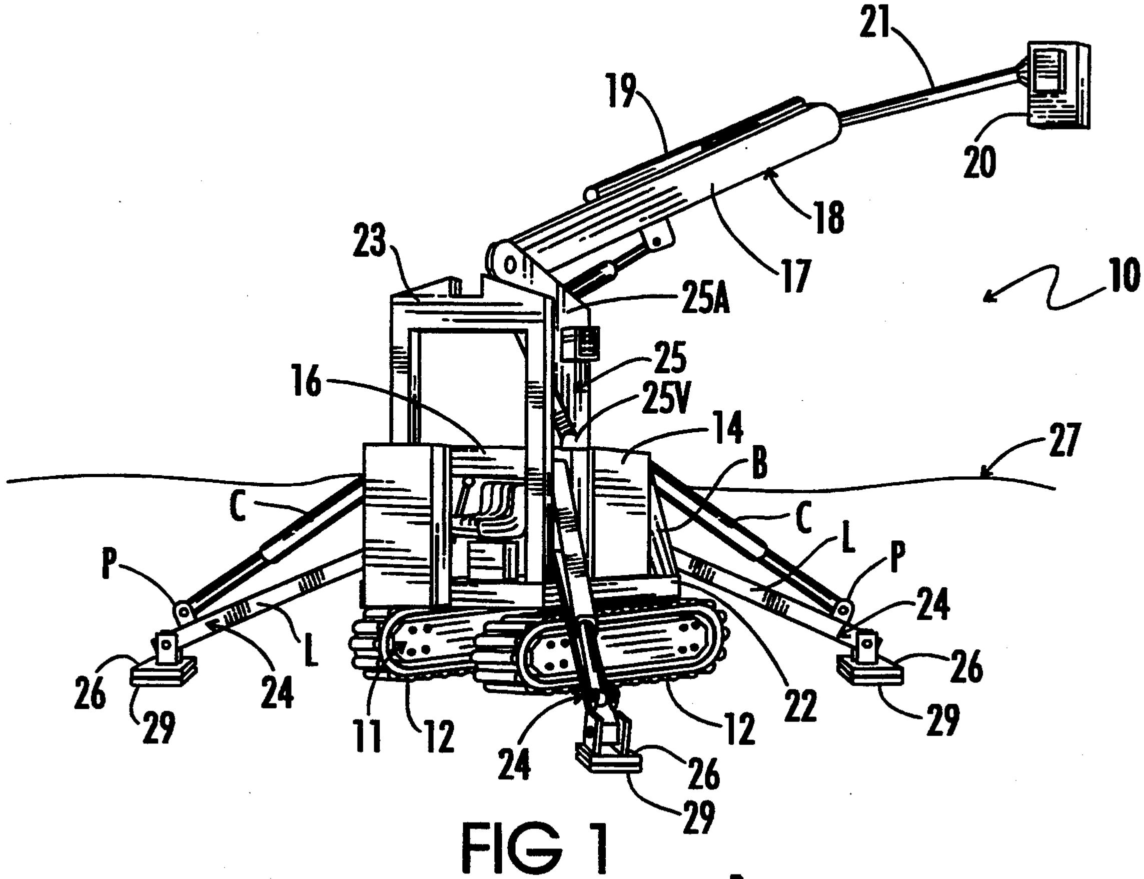
FIG. 1 is an elevated perspective view of an embodiment of the invention shown with the boom extended and outriggers in ground engaging contact.
Figure 2:
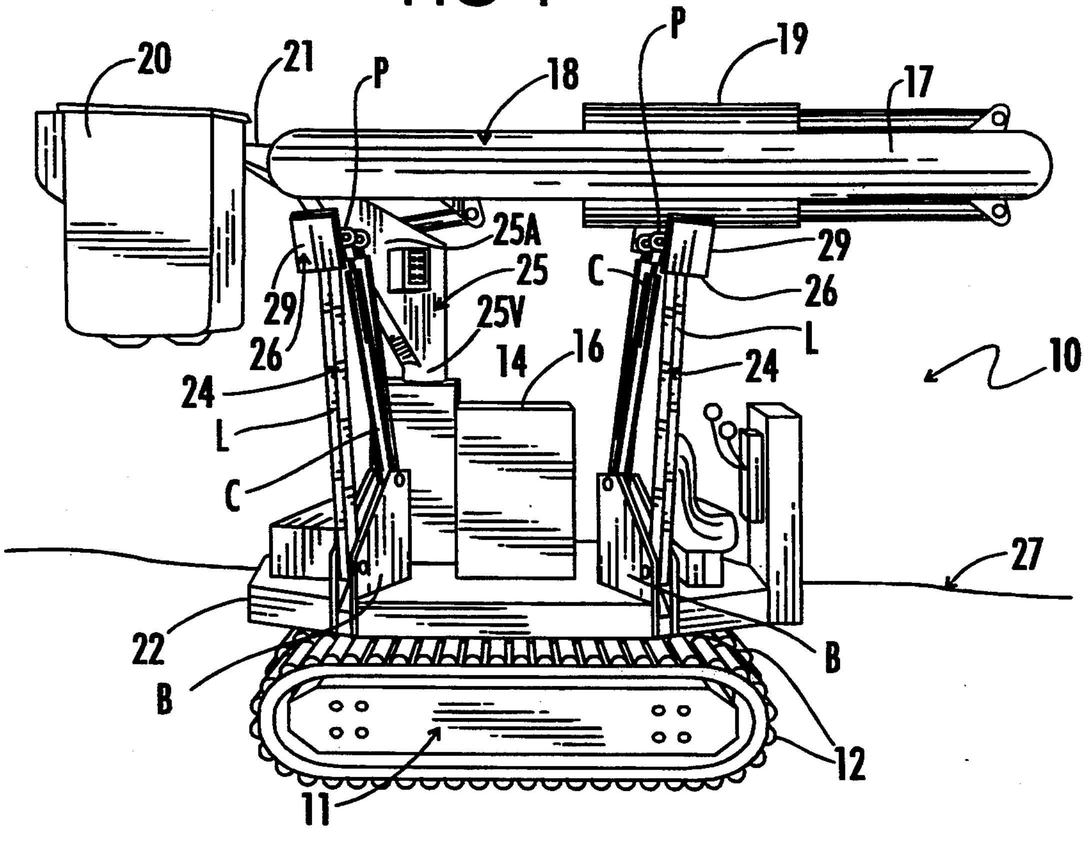
FIG. 2 is an elevated perspective view of the embodiment shown in FIG. 1 with the boom contracted and outriggers in their substantially vertical folded positions.

Referring now with particularity to the figures, it can be seen that an embodiment of the present inventive tracked vehicle is designated generally by the reference numeral 10. The vehicle 10 has a track means 11, comprising two spaced apart rubber or elastomeric tracks 12. The tracks may also be made from any other suitable electrical energy insulating material. The boom and outriggers are powered by a hydraulic pump means, designated generally by the reference numeral 14. The engine, designated generally by the reference numeral 16, which is used to power the pump 14, may be any suitable three stage pump, produced by any number of manufacturers, e.g., a diesel engine.

The vehicle is equipped with a hydraulically operated boom, designated generally by the reference numeral 18, which raises and positions the tool or bucket 20. The boom 18 is preferably formed from a lightweight, high strength, electrically non-conductive material such as fiberglass to provide an insulated barrier between electrical energy sources and the operator should the boom contact such a source. In addition, the preferred fiberglass boom 18 enables the vehicle 10 to be more stable and resistant to tipping as will be described below.

Boom 18 is comprised of a first section 17, having a hydraulic boom cylinder 19 parallel to the first section 17. First section 17 receives an extendable section 21 which is actuated from a retracted to an extendable position by the hydraulic cylinder 19.

The boom 18 can be lifted through an angle from a plane parallel to the ground, and can be extended to further lift the bucket 20 and extend it away from the vehicle 10. Optional boom support 23 receives the boom 18 when not in use or used in the supported the rest position. Further, the boom 18 can be rotated 360 degrees about the point of attachment on the platform 22 by a pivot or turret 25. The turret 25 is comprised of a substantially vertical portion 25V and an angled portion 25A. The angled portion 25A serves many purposes including acting as a counterbalance the boom 18.

The ability to pivot the boom 18 in this manner allows the operator of the vehicle 10 to reach more positions with the bucket 20 (or tool not shown) than with a traditional vehicle whose boom cannot be rotated through 360°, or extended in the manner described. In addition, the second section 21 of the boom 18 is allowed to articulate with respect to the first boom section 17, enabling the operator to contact the ground, designated generally by the reference numeral 27, with the bucket 20 (or tool not shown).

The ability to pivot, articulate, and rotate the boom 18 through 360° and to extend the second section 21 of the boom 18 so the bucket 20 reaches far from the vehicle 10 are dependent upon the four outriggers 24. Thus the outriggers 24 are positioned about the vehicle preferably in such a manner as to allow for maximum stability of the vehicle 10. Accordingly, their preferred placement is 90 degrees separation from one another.

Because the vehicle 10 is relatively small, and short in length and width as compared to other vehicles, albeit of a different type or configuration, the vehicle benefits from a small platform. The outriggers therefore enable the boom 18 and tool 20 to be extended far from the platform. Absent the outriggers 24, such extension would tend to cause the vehicle 10 to tip or topple over. Thus, the outriggers are provided to prevent or minimize the possibility of such an occurrence.

Simply stated, an outrigger 24 is placed approximately at each corner of the vehicle 10. Each outrigger 24 is comprised of a leg component L, and hydraulic cylinder component C. Each outrigger leg and hydraulic cylinder are preferably are pivotally attached to one another at pivot P, and are pivotally attached to the platform 22 by an outrigger brace B.

Each outrigger 24 extends in a direction which is at an angle of approximately 45° to the longitudinal axis of the vehicle, and as mentioned above 90 degrees spaced apart from one another. When the outrigger(s) 24 is/are extended, the foot 26, having a shoe 29, is placed on the ground far outside of the base of the vehicle 10.

For example, the foot 26 of the front right outrigger 24 is both far in front and far to the right of the base or platform 22 of the vehicle 10. Similarly, the front left outrigger 24 is both far out front and far to the left of the platform 22. Together, the four outriggers 24 form a generally rectangular area much larger than the platform 22 of the vehicle 10. This preferred orientation provides a much more stable base for the vehicle 10 when used.

The embodiment of the invention disclosed herein is but one embodiment of the invention, and modifications and variations can be made without departing from the spirit or scope of the invention as claimed.

What is claimed is:

1. A compact self-propelled vehicle having a longitudinal axis, said vehicle comprising:

(a) a platform;

(b) a pair of spaced apart tracks operably attached to the platform;

(c) a plurality of spaced apart outriggers, operatively attached to the platform, and movable from a substantially vertical rest position to a ground engaging position;

wherein each outrigger includes an independent pivot means for pivotally attaching each trigger independently to the platform and a hydraulic outrigger cylinder and each outrigger is positioned at an angle to the longitudinal axis of the vehicle;

(d) an extendable boom;

(e) turret means rotatably attached to the platform for rotating the boom;

(f) motor means mounted to the platform for powering the spaced apart tracks; and (g) hydraulic means actuated by the motor means for powering each hydraulic outrigger cylinder and the boom.

2. The self-propelled vehicle of claim 1 wherein:

the extendable boom further includes bucket means for carrying articles.

3. The self-propelled vehicle of claim 1 wherein:

the tracks are formed from an elastomeric material.

4. The self-propelled vehicle of claim 1 wherein:

each outrigger further includes a leg component, wherein each leg component and each hydraulic outrigger cylinder are pivotally connected to the platform.

5. The self-propelled vehicle of claim 1, wherein:

the boom is constructed of a material non-conductive to electrical energy.

6. The self-propelled vehicle of claim 4, wherein each leg component further includes: a foot.

7. The self-propelled vehicle of claim 4, wherein each of the plurality of outriggers further includes:

brace means for pivotally connecting a leg components and a hydraulic outrigger cylinder to the platform.

8. The self-propelled vehicle of claim 1, further including:

means for supporting the boom.

9. A compact industrial vehicle for off-road use and having a longitudinal axis, the vehicle comprising:

(a) a platform having track means for propelling the platform;

(b) an extendable boom attached to the platform allowing 360 degrees of rotation with respect to the track means;

(c) hydraulic outrigger means pivotally attached to the platform and operable between a substantially vertical rest position to an operable ground-engaging position, for stabilizing the platform; and (d) power means, attached to the platform, for powering the extendable boom, hydraulic outrigger means, and track means;

wherein the means includes a three stage pump means for providing hydraulic fluid pressure to the extendable boom, hydraulic outrigger means and track means enabling said boom, outrigger means and track means to be operated simultaneously and independently.

10. The vehicle of claim 9, wherein:

the hydraulic outrigger means comprises a plurality of outriggers wherein each outrigger has a leg and a hydraulic cylinder.

11. The vehicle of claim 10, wherein the hydraulic outrigger means further includes:

brace means for pivotally attaching each leg and each hydraulic cylinder to the platform.

12. The vehicle of claim 9, wherein the boom further comprises:

a first section and a second section operable between an extended and a contracted position, wherein the second section is configured for articulation with respect to the first section.

13. The vehicle of claim 12, wherein the boom further includes:

hydraulic means for extending and contracting the second section, and articulating the first section.

14. The vehicle of claim 10, wherein the plurality of outriggers further includes:

a plurality of feet.

15. The vehicle of claim 9 wherein the boom further includes:

turret means for counterbalancing the boom.

16. The vehicle of claim 9 wherein:

the track means and the boom are constructed of a material non-conductive to electrical energy.

17. A compact, light industrial vehicle having a longitudinal axis, comprising:

(a) a tracked platform;

(c) an extendable boom comprised substantially of a nonconductive material;

(d) turret means for rotatably attaching the extendable boom to the platform enabling the boom to rotate 360 degrees;

(e) a plurality of support outriggers each having a ground engaging end and a pivot end;

(f) pivot means associated with the platform for pivotally attaching the plurality of support outriggers to the tracked platform;

(g) hydraulic means for operating each outrigger and the extendable boom; and (h) drive means for energizing and propelling the tracked platform and supplying power to the hydraulic means.

18. The vehicle of claim 17 wherein the extendable boom further includes:

a first section, and a second section articulatable with respect to the first section.

19. The vehicle of claim 17, wherein the drive means further includes: a motor.

20. The vehicle of claim 17, wherein:

each of the plurality of support outriggers includes a leg portion and a hydraulic cylinder portion pivotally connected to each other.

* * * * *